(12) United States Patent
Bergin et al.

(10) Patent No.: US 10,877,129 B2
(45) Date of Patent: Dec. 29, 2020

(54) SYSTEM AND METHOD FOR MODELING ENVIRONMENTAL DATA

(71) Applicant: INFORMATION SYSTEMS LABORATORIES, INC., San Diego, CA (US)

(72) Inventors: Jameson S. Bergin, Glastonbury, CT (US); Joseph R. Guerci, La Jolla, CA (US); David R. Kirk, Springfield, VA (US)

(73) Assignee: Information Systems Laboratories, Inc., San Diego, CA (US)

( * ) Notice: Subject to any disclaimer, the term of this patent is extended or adjusted under 35 U.S.C. 154(b) by 290 days.

(21) Appl. No.: 16/201,677

(22) Filed: Nov. 27, 2018

(65) Prior Publication Data
US 2020/0166608 A1    May 28, 2020

(51) Int. Cl.
| G01S 19/23 | (2010.01) |
| G01S 7/40 | (2006.01) |
| G01S 7/41 | (2006.01) |

(52) U.S. Cl.
CPC .......... G01S 7/4052 (2013.01); G01S 7/412 (2013.01); G01S 19/23 (2013.01); G01S 2007/4086 (2013.01)

(58) Field of Classification Search
CPC .......... G01S 19/23; G01S 2007/4086; G01S 7/4052; G01S 7/412
See application file for complete search history.

(56) References Cited

U.S. PATENT DOCUMENTS

| 4,686,127 A | 8/1987 | Burns |
| 5,789,830 A | 8/1998 | Portegies |
| 2003/0102999 A1 | 6/2003 | Bergin |
| 2007/0282560 A1 | 6/2007 | Anderson |
| 2009/0051681 A1 | 2/2009 | Sharp |
| 2012/0259603 A1 | 10/2012 | Ong |
| 2013/0271317 A1 | 10/2013 | Goel |
| 2016/0074669 A1 | 3/2016 | Grant |

(Continued)

OTHER PUBLICATIONS

Pendleton, The Fundamentals of GPS, Jul. 17, 2002, Directions Magazine, pp. 1-11 (year: 2002).

(Continued)

*Primary Examiner* — Timothy A Brainard
(74) *Attorney, Agent, or Firm* — Nydegger & Associates

(57) ABSTRACT

The present invention is for a system and method for testing an RF/radar system in a simulated open-air environment. During a test, the RF/radar system-under-test interfaces directly with the simulated open-air environment and operates in real time. For test purposes, an environmental database is provided to mimic the simulated open-air environment using a plurality of digitized impulse functions. A computation engine then cross-correlates the digitized impulse functions of the environmental database in fast time with digitized RF transmissions from the system-under-test to format a digital convolution. The digital convolution is then test-evaluated. For the present invention, the digital convolution is based on the theory of Green's Functions and is influenced by propagation and reflection physics (i.e. Maxwell's Equations) that are pertinent to the simulated open-air environment.

20 Claims, 1 Drawing Sheet

(56) References Cited

U.S. PATENT DOCUMENTS

2016/0076019 A1 3/2016 Grant
2017/0206287 A1* 7/2017 Bergin .................... G02F 1/29

OTHER PUBLICATIONS

Lucas, What is Electromagnetic Radiation?, Mar. 12, 2015, Live Science, pp. 1-5—(Year 2015).
Bergin, A New Approach for Testing Autonomous and Fully Adaptive Radars, IEEE Radar Conference (Year: 2017).

* cited by examiner

SYSTEM AND METHOD FOR MODELING ENVIRONMENTAL DATA

FIELD OF THE INVENTION

The present invention pertains generally to systems and methods for creating a simulated open-air environment that can be used to test transmissions from an RF/radar System-Under-Test (SUT). More particularly, the present invention pertains to a test facility wherein an RF/radar system-under-test can interface directly with the simulated open-air environment for a test evaluation in real time. The present invention is particularly, but not exclusively, useful as a test facility for generating input-output responses from a simulated open-air environment wherein the responses are collectively presented as a digital convolution based on the theory of Green's Functions and are evaluated in accordance with propagation and reflection physics (i.e. Maxwell's Equations) that are pertinent to the simulated open-air environment.

BACKGROUND OF THE INVENTION

From a logistical perspective, the operational field testing of an RF/radar system-under-test for the purpose of evaluating its ability to track targets in an open-air environment can be both costly and time-consuming. An alternative here is that the initial testing can be done using simulation and computer processing techniques. Such a simulation necessarily raises concerns associated with replicating an appropriate electromagnetic response from the system-under-test. The question is essentially two-fold. For one, how can a simulated electromagnetic environment be created that will accurately mimic an actual open-air environment. For another, how can test response data be properly processed and presented to provide a real time assessment of the system-under-test.

It is well known in the pertinent art that a plurality of Green's Functions can be used as an impulse response. It is also well known that Maxwell's Equations can be employed to effectively describe the behavior of electromagnetic waves. Further, in the context of an electromagnetic environment, the interaction between electromagnetic radiations into the environment (i.e. RF transmissions), and a database that simulates the environment (i.e. a Green's Function) will format a digital convolution that can be influenced by appropriate Maxwell's Equations.

As alluded to above, for the purposes of an effective simulated RF/radar test facility, data from the test results are preferably presented in a digitized format that is generated for evaluation in real time. An appropriate system for real time processing such data is disclosed in U.S. patent application Ser. No. 14/995,995 for a "Real-Time Electromagnetic Environmental Simulator", which is assigned to the assignee of the present invention.

In light of the above, it is an object of the present invention to provide an environmental database that will provide an "input-output" response that exactly mimics what a device under test would see if it were to radiate freely into an open-air environment. Another object of the present invention is to provide an environmental database for mimicking a simulated open-air environment that includes a plurality of digitized impulse functions which collectively characterize a domain defined by boundary conditions for the simulated open-air environment. Another object of the present invention is to provide a system for cross-correlating digitized impulse functions representing an open-air environment with digitized RF transmissions from a system-under-test to format digital convolutions within a predetermined time interval to evaluate the operational efficacy of the system-under-test in real time. Still another object of the present invention is to provide a system for testing an RF system in a simulated open-air environment that is simple to use, is relatively easy to manufacture and is comparatively cost effective.

SUMMARY OF THE INVENTION

In accordance with the present invention, testing an RF/radar system in a simulated open-air environment requires a structural and functional cooperation between three basic components. These include: an environmental database; the RF/radar system-under-test; and a computation engine. In particular, the present invention requires the use of Green's Functions to construct the environmental database. Maxwell's Equations are then applied to evaluate digitized electromagnetic responses that result when RF transmissions are sent into the simulated open-air environment. For purposes of the present invention, the digitized responses are presented in a format that can be processed and evaluated in real time.

In particular, the environmental database is created to mimic a desired test environment. To do this, the environmental database includes several specific databases that separately describe different aspects of the simulated open-air environment. These different databases include: i) a digital terrain database that provides terrestrial information regarding; ii) a target location and reflectivity database that provides information regarding target locations and movements within the environment; iii) an atmospheric propagation database that establishes predetermined meteorological conditions for the environment; and iv) an electromagnetic interference and electromagnetic attack information database that presents unwanted adverse electromagnetic conditions in the environment. The resulting simulated open-air environment is thus, a combination of several individually different databases.

In greater detail, the digital terrain database will preferably include a plurality of digitized impulse functions for terrain elevations, urban environments, land-cover/land-use conditions, and electromagnetic environmental data sources. The target location and reflectivity database will also include a plurality of digitized impulse functions for characterizing physical characteristics of targets and target locations, as well as pertinent target kinematics and reflectivity properties. Further, the atmospheric propagation database will preferably include a plurality of digitized impulse functions for characterizing physical and meteorological data that are pertinent to electromagnetic propagation effects in the open-air environment. And, the electromagnetic interference and electronic attack database will preferably include a plurality of digitized impulse functions for characterizing electromagnetic perturbations simulated in the open-air environment.

Collectively, the various databases described above are created as a plurality of digitized impulse functions (i.e. a Green's Function). Together, the plurality of digitized impulse functions will characterize a predetermined test domain (i.e. a simulated open-air environment) that is defined by selected boundary conditions.

For an operation of an RF/radar system-under-test (SUT) in accordance with the present invention, a location for the SUT is established in the digital terrain database (i.e. environmental database). Digitized RF transmissions are then radiated into the simulated open-air environment from the SUT at the established location in real time. Next, a computation engine cross-correlates the digitized RF transmissions from the SUT with the digitized impulse functions of the environmental database to format a digital convolution. For the present invention, this digital convolution is to be influenced by electromagnetic propagation and reflection physics that are characterized in the boundary conditions of the environmental database. All of this is done to test the operational efficacy of the system-under-test within a predetermined operational time interval that simulates a real time response in an actual open-air environment.

In detail, response signals received from the digitized RF transmissions that have been radiated into the simulated open-air environment are manipulated by the computation engine. Specifically, this manipulation is performed using a Green's Function data format for creating the digital convolution. It also entails an electromagnetic ray tracing operation that is consistent with pertinent Maxwell's Equations. In further detail, the operational time interval for manipulating each RF transmission is established to extend from the time the RF transmission leaves the RF/radar SUT until the time it is received as a response signal at the RF/radar SUT. Importantly, the predetermined time interval for creating the digital convolution must be less than the operational time interval for RF transmission travel.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
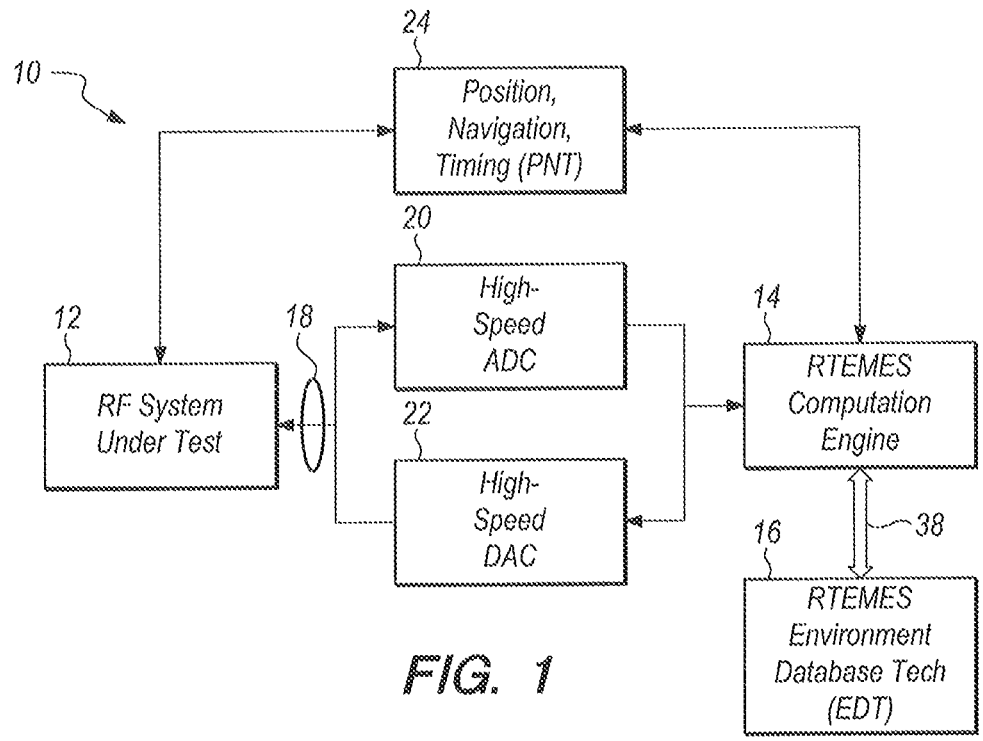
FIG. 1 is a schematic presentation of components used for creating a simulated open-air environment in accordance with the present invention.

Referring initially to FIG. 1, a system architecture generally designated 10 is shown that includes a combination of operational components which must be considered collectively. As shown the architecture 10 involves the interaction of a system-under-test (SUT) 12 with a computation engine 14. In this combination the SUT 12 transmits/receives RF transmissions to/from the computation engine 14 for further evaluation of the RF transmissions as input-output responses. Also shown in FIG. 1 is a computation engine 16 which is interconnected with the computation engine 14. Specifically, the computation engine 16 is used to provide a simulated open-air environment (not shown) for the computation engine 14 in which the operational efficacy of the SUT 12 can be determined.

In accordance with the present invention, analog RF transmissions from the SUT 12 are converted into digital signals for further processing by the computation engine 14 and the computation engine 16. To do this, an analog multichannel RF port 18 (Tx/Rx) is provided for separate connections of the SUT 12 with a high speed analog/digital converter 20 (ADC), and a high speed digital/analog converter 22 (DAC). As shown, both the ADC 20 and the DAC 22 are connected with the computation engine 14. FIG. 1 also shows that digitized data 24 that is pertinent to position, navigation and timing (PNT) information about target(s) of interest for the SUT 12 are provided to both the SUT 12 and the computation engine 14.

Figure 2:
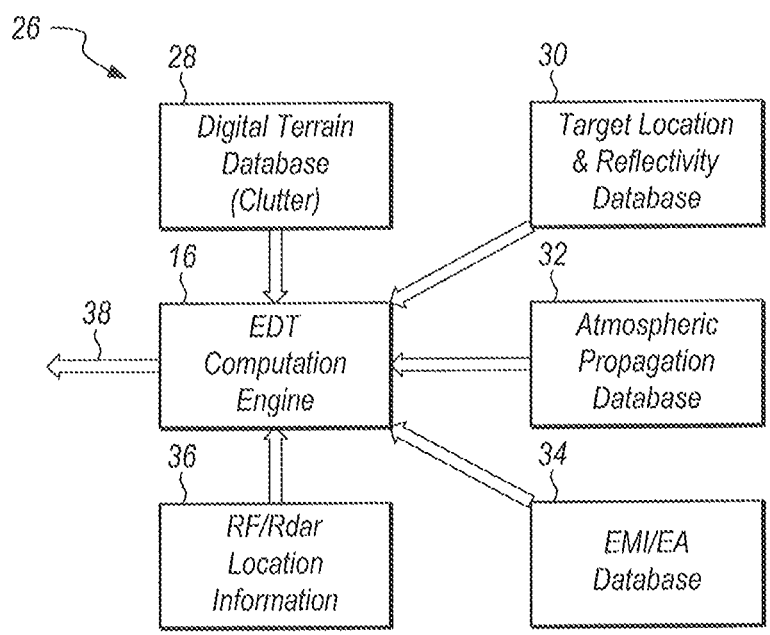
FIG. 2 is a time-line of the functional tasks performed by the present invention when evaluating an RF transmission that has been directed into the simulated open-air environment from an RF/radar system-under-test.

FIG. 2 shows that the computation engine 16 receives input data from several different databases. Collectively these databases define an Environmental Database Technology (EDT) which is generally referred to herein as an environmental database 26. In particular, the databases that constitute the environmental database 26 pertain to different aspects of a simulated open-air environment and include: i) a digital terrain database 28; ii) a target location and reflectivity database 30; iii) an atmospheric propagation database 32; iv) an electromagnetic interference and electromagnetic attack information database 34; and v) location information 36 for the SUT 12.

As intended for the present invention, the environmental database 26 is specifically created to mimic a desired test environment for the SUT 12. For this purpose, the digital terrain database 28 portion of the environmental database 26 provides terrestrial information pertaining to topography, terrain elevations, and vegetation, as well as man-made constructions in the environment such as urban environments, and land-cover/land-use conditions. For another aspect of the simulated open air-environment, the target location and reflectivity database 30 provides PNT information regarding target locations under testing conditions that include mobile and stationary target activity within the environment. The atmospheric propagation database 32 for the environmental database 26 establishes predetermined meteorological conditions for the environment as well as exemplary forecast changes in these conditions. Further, the electromagnetic interference and electromagnetic attack information database 34 identifies unwanted adverse electromagnetic conditions in the environment. In addition to the testing conditions established by the environmental database 26 for the simulated open air environment, selected locations for the SUT 12 can be inserted into the environment, and changed as desired, by manipulation of location information 36 for the SUT 12.

For an operation of the present invention, FIG. 2 indicates that the environmental database 26 is initially compiled by the computation engine 16. Also, it is shown that the computation engine 14 which interacts with the SUT 12 will have operational access to the environmental database 26 via an interconnecting link 38.

As noted above, Green's Functions are used to construct the environmental database 26 for the simulated open-air environment. It is also noted that digitized RF transmissions from the SUT 12 are radiated into the simulated open-air environment to interact with the environmental database 26, and thereby generate digital convolutions. Maxwell's Equations are also incorporated to evaluate the influence on electromagnetic RF transmissions when they are sent from SUT 12 into the simulated open-air environment. It is important for the present invention that these digitized responses are presented in a format that can be processed and evaluated in real time.

In detail, the digitized RF transmissions that have been radiated into the simulated open-air environment are manipulated by the computation engine 14. Specifically, this manipulation is performed using a Green's Function data format for creating the digital convolution. Also, an electromagnetic ray tracing operation that is consistent with pertinent Maxwell's Equations is performed to determine the influence the simulated environment has had on the RF transmissions.

The operational time interval for manipulating each RF transmission is established to extend from the time the RF transmission leaves the RF/radar SUT until the time it is received as a response signal at the RF/radar SUT. Importantly, the predetermined time interval for creating the digital convolution must be less than the operational time interval for RF transmission travel.

While the particular System and Method for Modeling Environmental Data as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for testing an RF/radar system-under-test in a simulated open-air environment which comprises;
   an environmental database for mimicking the simulated open-air environment, wherein the environmental database includes a plurality of digitized impulse functions, and wherein the plurality of digitized impulse functions collectively characterize a domain defined by boundary conditions of the simulated open-air environment;
   an RF/radar system-under-test for radiating digitized RF transmissions directly into the simulated open-air environment in real time, wherein location information for the system-under-test is incorporated into the environmental database; and
   a computation engine for cross-correlating the digitized impulse functions in the environmental database with the digitized RF transmissions from the system-under-test to format a digital convolution within a predetermined time interval, wherein the digital convolution is influenced by electromagnetic propagation and reflection physics characterized in the boundary conditions of the environmental database to test an operational efficacy of the system-under-test.

2. The system of claim 1 wherein the environmental database comprises:
   a digital terrain database including terrestrial information;
   a target location and reflectivity database including mobile and stationary target information;
   an atmospheric propagation database; and
   an electromagnetic interference and electromagnetic attack information database.

3. The system of claim 2 wherein the digital terrain database includes a plurality of digitized impulse functions for terrain elevations, urban environments, land-cover/land-use conditions, and electromagnetic environmental data sources.

4. The system of claim 2 wherein the target location and reflectivity database includes a plurality of digitized impulse functions for characterizing physical characteristics of targets, target locations and pertinent kinematics, and reflectivity properties.

5. The system of claim 2 wherein the atmospheric propagation database includes a plurality of digitized impulse functions for characterizing physical and meteorological data pertinent to electromagnetic propagation effects in the open-air environment.

6. The system of claim 2 wherein the electromagnetic interference and electronic attack database includes a plurality of digitized impulse functions for characterizing electromagnetic perturbations simulated in the open-air environment.

7. The system of claim 2 wherein response signals from the digitized RF transmissions into the simulated open-air environment are computed by the computation engine from the digital convolution into a Green's Function data format.

8. The system of claim 7 wherein computations of the Green's Function data format entails an electromagnetic ray tracing operation consistent with Maxwell's Equations.

9. The system of claim 1 wherein an operational time interval is established as extending from the time an RF transmission leaves the RF/radar system-under-test until the time the RF transmission is received as a response signal at the RF/radar system-under-test, and wherein the predetermined time interval for formatting the digital convolution is less than the operational time interval.

10. A method for testing an RF transmission from a system-under-test in a simulated open-air environment which comprises the steps of:
   defining the open-air environment to represent physical properties, meteorological properties, and clutter sources in the open-air environment, to include target locations, land-cover/land-use data, and electromagnetic environmental data sources;
   creating an environmental database for the simulated open-air environment, wherein the environmental database includes a plurality of digitized impulse functions, and wherein the plurality of impulse functions collectively characterize a domain defined by boundary conditions of the simulated open-air environment;
   incorporating a location for the system-under-test in the environmental database;
   operating the system-under-test to radiate digitized RF transmissions from the location of the system-under-test into the simulated open-air environment;
   cross-correlating the digitized impulse functions in the environmental database with the digitized RF transmissions from the system-under-test to format a digital convolution within a predetermined time interval; and
   influencing the digital convolution with electromagnetic propagation and reflection physics characterized in the boundary conditions of the simulated open-air environment to determine an operational efficacy for the system-under-test.

11. The method of claim 10 further comprising the step of establishing an operational time interval between the time an RF transmission leaves the RF/radar system-under-test and the time the RF transmission is received as a response signal at the RF/radar system-under-test, and wherein the predetermined time interval for formatting the digital convolution is less than the operational time interval.

12. The method of claim 10 further comprising the steps of:
   forming the digital convolution into a Green's Function data format; and
   performing an electromagnetic ray tracing operation on the Green's Function data format consistent with Maxwell's Equations to evaluate response signals from the digitized RF transmissions.

13. The method of claim 10 wherein the environmental database comprises:
   a digital terrain database including terrestrial information;
   a target location and reflectivity database including mobile and stationary target information;
   an atmospheric propagation database; and an electromagnetic interference and electromagnetic attack information database.

14. The method of claim 13 wherein the digital terrain database includes a plurality of digitized impulse functions for terrain elevations, urban environments, land-cover/land-use conditions, and electromagnetic environmental data sources.

15. The method of claim 13 wherein the target location and reflectivity database includes a plurality of digitized impulse functions for characterizing physical characteristics of targets, target locations and pertinent kinematics, and reflectivity properties.

16. The method of claim 13 wherein the atmospheric propagation database includes a plurality of digitized impulse functions for characterizing physical and meteorological data pertinent to electromagnetic propagation effects in the open-air environment.

17. The method of claim 13 wherein the electromagnetic interference and electronic attack database includes a plurality of digitized impulse functions for characterizing electromagnetic perturbations simulated in the open-air environment.

18. A method for assembling a test facility for testing an RF/radar system-under-test in a simulated open-air environment which comprises the steps of:
creating an environmental database to mimic the simulated open-air environment, wherein the environmental database includes a plurality of digitized impulse functions, and wherein the plurality of digitized impulse functions collectively characterize a domain defined by boundary conditions of the simulated open-air environment;
interfacing an RF/radar system-under-test with the environmental database for radiating digitized RF transmissions directly into the simulated open-air environment in real time, wherein location information for the system-under-test is incorporated into the environmental database; and
using a computation engine for cross-correlating the digitized impulse functions in the environmental database with the digitized RF transmissions from the system-under-test to format a digital convolution within a predetermined time interval, wherein the digital convolution is influenced by electromagnetic propagation and reflection physics characterized in the boundary conditions of the environmental database to determine an operational efficacy of the system-under-test.

19. The method of claim 18 further comprising the step of establishing an operational time interval between the time an RF transmission leaves the RF/radar system-under-test and the time the RF transmission is received as a response signal at the RF/radar system-under-test, and wherein the predetermined time interval for formatting the digital convolution is less than the operational time interval.

20. The method of claim 19 further comprising the steps of:
forming the digital convolution into a Green's Function data format; and
performing an electromagnetic ray tracing operation on the Green's Function data format consistent with Maxwell's Equations to evaluate response signals from the digitized RF transmissions.

* * * * *